United States Patent [19]

Musha

[11] Patent Number: 4,479,051

[45] Date of Patent: Oct. 23, 1984

[54] APPARATUS FOR DRIVING OBJECTIVE LENS IN TRACKING DIRECTION

[75] Inventor: Toru Musha, Hachioji, Japan

[73] Assignee: Olympus Optical Co. Ltd., Japan

[21] Appl. No.: 139,756

[22] Filed: Apr. 14, 1980

[30] Foreign Application Priority Data

| Apr. 27, 1979 [JP] | Japan | 54-52236 |
| Dec. 28, 1979 [JP] | Japan | 54-170247 |
| Feb. 16, 1980 [JP] | Japan | 55-17208 |

[51] Int. Cl.³ .............................................. G05B 1/00
[52] U.S. Cl. ...................................... 250/202; 369/44; 350/247
[58] Field of Search .................. 250/202, 570, 201; 369/46, 45, 44; 350/247, 255; 360/77, 78

[56] References Cited

U.S. PATENT DOCUMENTS

| 4,123,147 | 10/1978 | Hill et al. | 369/46 |
| 4,144,542 | 3/1979 | Preuss | 369/45 |
| 4,193,091 | 3/1980 | Kleuters et al. | 369/45 |

Primary Examiner—David C. Nelms
Attorney, Agent, or Firm—Parkhurst & Oliff

[57] ABSTRACT

An apparatus for driving an objective lens which projects a light spot onto an information track or tracks recorded spirally or concentrically on a disc-shaped record medium to read out information, in order to correct a tracking error, comprises a pair of leaf springs for supporting the objective lens movably in a tracking direction perpendicular to the optical axis of objective lens as well as to the track direction, a movable member made of magnetic material and being coupled with the movable member to move in the tracking direction in conjunction with the objective lens, first and second magnetic members made of magnetic material and arranged in such a manner that the movable member is interposed between the first and second magnetic members at their one end portions via gaps, a third magnetic member made of magnetic material for coupling the first and second magnetic members at their other end portions, first and second coils wound on the one end portions of the first and second magnetic members, respectively, and magnetic flux producing means such as a permanent magnet and an electromagnet for producing a constant magnetic flux through the first, second and third magnetic members and the movable member. The gaps may be filled with magnetic fluids.

98 Claims, 23 Drawing Figures

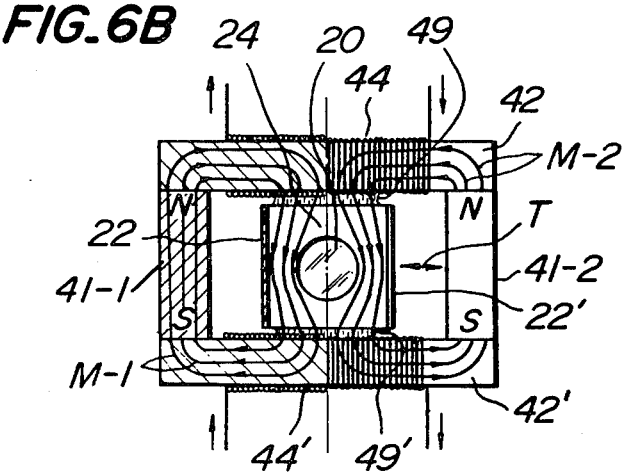
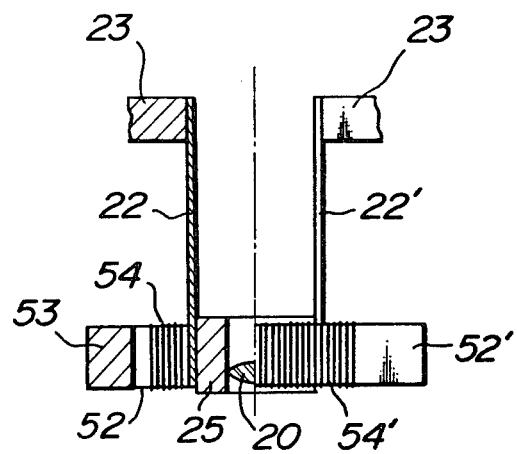
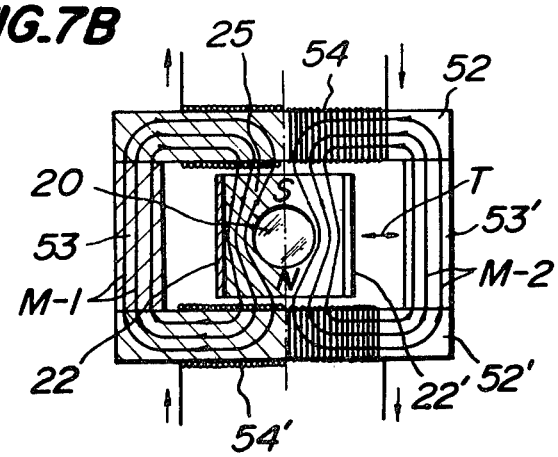

APPARATUS FOR DRIVING OBJECTIVE LENS IN TRACKING DIRECTION

BACKGROUND OF THE INVENTION

The present invention relates to an apparatus for driving an objective lens for correcting a relative positional error, i.e., a tracking error between one or more information tracks recorded spirally or concentrically on a disc-shaped record medium and a light spot projected onto the record medium by means of the objective lens.

In an apparatus for reproducing or picking-up an information from the above mentioned record medium, the record medium is usually called as a video disc in which encoded video and audio signals are recorded as optical information such as an optical transmitting, reflection, phase property. While the video disc is rotated at a high speed such as thirty revolutions per second, i.e. 1,800 rpm, a laser beam emitted from a laser light source such as a helium-neon gas laser is focussed on the tracks of the disc as a light spot and the optical information is read out. One of important properties of such a record medium is a very high density of recorded information and thus a width of the information track is very narrow and a space between successive tracks is also very narrow. In a typical video disc described in, for instance, Philips Technical Review, Vol. 33, 1973, No. 7, a pitch of the tracks amounts only to 2 $\mu$m. Therefore the diameter of light spot should be correspondingly small such as 1 to 2 $\mu$m. In order to pick-up correctly the recorded information from such tracks having very narrow width and pitch a mutual positional error between the light spot and tracks, i.e., a tracking error should be reduced as little as possible. In U.S. Pat. Nos. 3,909,608 and 3,882,317, it has been proposed to effect a so-called tracking control in which a mutual displacement of the light spot and track is photoelectrically detected to produce a tracking error signal and the light spot is moved or shifted in a direction perpendicular to the track in accordance with the detected tracking error signal. In the U.S. Pat. No. 3,882,317 as a tracking mechanism use is made of an oscillating mirror inserted in an optical path from a laser light source to an objective lens, and the mirror is rotated in accordance with the detected tracking error signal. However such a tracking mechanism could not attain a sufficiently high accuracy and is liable to be large in size. Further the known tracking mechanism is rather expensive.

In order to avoid the above mentioned drawback of the known tracking mechanism it has been further proposed that the objective lens on its holder is supported by a resiliently supporting member comprising springs, e.g. leaf springs, and the objective lens is moved in a direction perpendicular to the optical axis of objective lens as well as to the tangential direction of the information track by means of an electromechanical transducer in accordance with the tracking error signal. Hereinafter the direction in which the objective lens is moved for effecting the tracking control is termed as a tracking direction. As the electromechanical transducer use may be made of electromagnet, voice coil, piezoelectric element, etc. In order to obtain a good response property for tracking the assembly should be made small in size and light in weight. In an actual reading-out apparatus in addition to the tracking error a so-called focussing error is produced in which the light spot could not be correctly focussed on the information track. For correcting the focussing error there should be provided with a focussing mechanism for moving or displacing the objective lens in a direction of its optical axis. When the tracking mechanism is installed on the focussing mechanism, the tracking mechanism should be smaller in size and lighter in weight for attaining an accurate focussing correction. In the tracking mechanism with the electromagnet a sufficient force necessary for moving the objective lens can be produced and the mechanism can be constructed small and light in a relatively simple manner. However, an accurate tracking correction could not be effected, because a relation between an amount of electric current passing through a coil of the electromagnet and an amount of displacement of the objective lens is not linear. In the tracking mechanism comprising a voice coil, a miniaturization could hardly be attained. Further the tracking mechanism with the piezoelectric elements could not produce a sufficiently large driving force for driving the objective lens.

SUMMARY OF THE INVENTION

The invention has for its object to provide a novel and useful apparatus for correcting a tracking error between information track and a light spot formed by an objective lens, which apparatus can move the objective lens in the tracking direction in a linear manner with respect to an amount of the tracking error signal.

It is another object of the invention to provide a driving apparatus which can be easily made small in size and light in weight and can produce a sufficiently large driving force necessary for obtaining an excellent response.

It is still another object of the invention to provide a driving apparatus which can be advantageously assembled together with a focussing mechanism so as to drive the objective lens in two-dimensions, i.e. both in the tracking and focussing directions.

According to the invention an apparatus for driving an objective lens for correcting a relative positional error, i.e., a tracking error between an information track recorded spirally or concentrically on a record medium and a light spot projected onto the record medium by means of the objective lens comprises means for supporting the objective lens movably in a tracking direction perpendicular to an optical axis of the objective lens as well as to the information track;

a movable member made of magnetic material and arranged movably in the tracking direction in conjunction with the objective lens;

first and second magnetic members made of magnetic material and arranged in such a manner that the movable member is interposed therebetween via gaps viewed in a direction substantially perpendicular to the tracking direction to form together with the movable member a magnetic circuit passing through the first magnetic member, the gap between the first magnetic member and movable member, the movable member, the gap between the movable member and second magnetic member, and the second magnetic member;

means arranged in part of the magnetic circuit for producing a constant magnetic flux through the magnetic circuit; and first and second coils wound on the first and second magnetic members, respectively, at portions opposite to the movable member for producing a magnetic flux in the first and second magnetic member portions substantially in parallel with the tracking direction; whereby said first and second coils are supplied with signals corresponding to a tracking error signal representing the tracking error so as to move the movable member and thus the objective lens in the tracking direction.

In the driving apparatus of the invention, when the first and second coils wound on the first and second magnetic members, respectively and arranged in the magnetic flux are supplied with the currents corresponding to the tracking error signal, the movable member is subjected to a driving force. In this case the direction of movement of the movable member can be determined by the directions of electric currents supplied to the coils. Further an amount of displacement of movable member, and thus the objective lens in the tracking direction can be made linear with respect to an amount of the current supplied to the coils. Further the magnetic members, movable member and coils can be made extremely small in size and light in weight, and thus the whole assembly can be made very compact. Therefore the objective lens can be moved at a very high speed so as to obtain a desired response owing to a great driving force.

In a preferred embodiment of the invention, the gaps between the movable member and the first and second magnetic members, respectively are filled with magnetic fluid. In this embodiment the magnetic fluid can be maintained in the gaps due to the relatively strong magnetic flux and has a viscosity for providing a suitable damping property which is necessary for obtaining an excellent response.

In another preferred embodiment according to the invention, the first and second magnetic members are so arranged with respect to the movable member that the movable member is interposed therebetween at their one end portions on which the first and second coils are wound, respectively, and the apparatus further comprises a third member made of magnetic material for coupling the first and second magnetic members with each other at their other end portions. This embodiment requires a minimum number of elements and can be manufactured in a very simple manner.

In still another embodiment of the invention, the apparatus comprises fourth and fifth magnetic members made of magnetic material and arranged so that the movable member is interposed therebetween via gaps at their one end portions;

a sixth magnetic member made of magnetic material for coupling the fourth and fifth magnetic members with each other at their other end portions so as to form a second magnetic circuit together with the fourth and fifth magnetic members and the movable member;

third and fourth coils wound on the one end portions of the fourth and fifth magnetic members, respectively; and second means arranged in part of the second magnetic circuit for producing a constant magnetic flux through the second magnetic circuit; whereby the third and fourth coils are supplied with signals corresponding to the tracking error signal.

In still another preferred embodiment of the invention, the apparatus further comprises third and fourth magnetic members made of magnetic material, and the first and second magnetic members are so arranged that the movable member is interposed between them substantially at their middle portions and both ends of the first and second magnetic members are coupled with each other by the third and fourth magnetic members so as to form a first magnetic circuit including the first, second and third magnetic members and the movable member and a second magnetic circuit including the first, second and fourth magnetic members and the movable member.

In order to correct a variation in a distance between the objective lens and information track a preferred embodiment of the invention further comprises a focussing mechanism which comprises an intermediate member with which the objective lens is coupled by means of said supporting means;

second supporting means for supporting the intermediate member movably in a focussing direction in parallel with the optical axis of objective lens with respect to a fixed body of the apparatus; and means for driving the intermediate member and thus the supporting means, objective lens and movable member in the focussing direction in response to a focussing error signal corresponding to the variation in said distance; whereby the first, second and third magnetic members are secured to the fixed body of apparatus.

In a preferred embodiment of the invention, the intermediate member is formed by a hollow cylindrical body extending in the direction of the optical axis of objective lens and the objective lens is arranged inside the intermediate cylindrical body movably in the tracking direction.

In a further preferred embodiment of the invention, the means for supporting the objective lens comprises a pair of leaf springs extending inside the cylindrical body in the direction of the optical axis of objective lens, one ends of the leaf springs are secured to the objective lens and the other ends of the leaf springs are secured to an end portion of the cylindrical body.

In still another preferred embodiment of the invention, the means for driving the cylindrical body made of non-magnetic material in the focussing direction comprises a voice coil wound on a ring-like member connected to the cylindrical body and a magnet assembly which includes a permanent magnet and is secured to the fixed body for producing a magnetic flux passing through the voice coil, and the voice coil is supplied with a signal corresponding to a focussing error signal representing the variation in the distance so as to move the cylindrical body and thus the objective lens in the focussing direction.

In a preferred embodiment of the invention, the means for supporting the intermediate cylindrical body comprises a pair of leaf spring members arranged between the intermediate cylindrical body and the outer cylindrical body at their upper and lower ends, respectively.

Further in a preferred embodiment, the fixed part of the apparatus is formed by an outer cylindrical body made of non-magnetic material and arranged outside and coaxially with the intermediate cylindrical body and the means for supporting the intermediate cylindrical body comprises a pair of leaf spring members arranged between the intermediate cylindrical body and the outer cylindrical body at their upper and lower ends, respectively.

In still another preferred embodiment of the invention, the first and second coils wound on the first and second magnetic members, respectively, and the first and second magnetic flux producing means are so constructed that the magnetic flux produced by these coils has a direction which is the same as that of the magnetic flux passing through the first magnetic circuit, but is opposite to that of the magnetic flux passing through the second magnetic circuit, and vice versa, so that the movable member can be moved in the tracking direction linearly in accordance with the tracking signal.

BRIEF DESCRIPTION OF THE DRAWINGS

FIGS. 6A and 6B are side and plan views, respectively showing still another embodiment of the driving apparatus according to the invention, in which figures a left hand half being cut;

FIGS. 7A and 7B are side and plan views, respectively illustrating still another embodiment of the driving apparatus according to the invention, in these figures a left-hand half being shown as cross section;

DESCRIPTION OF THE PREFERRED EMBODIMENTS

Figure 1:
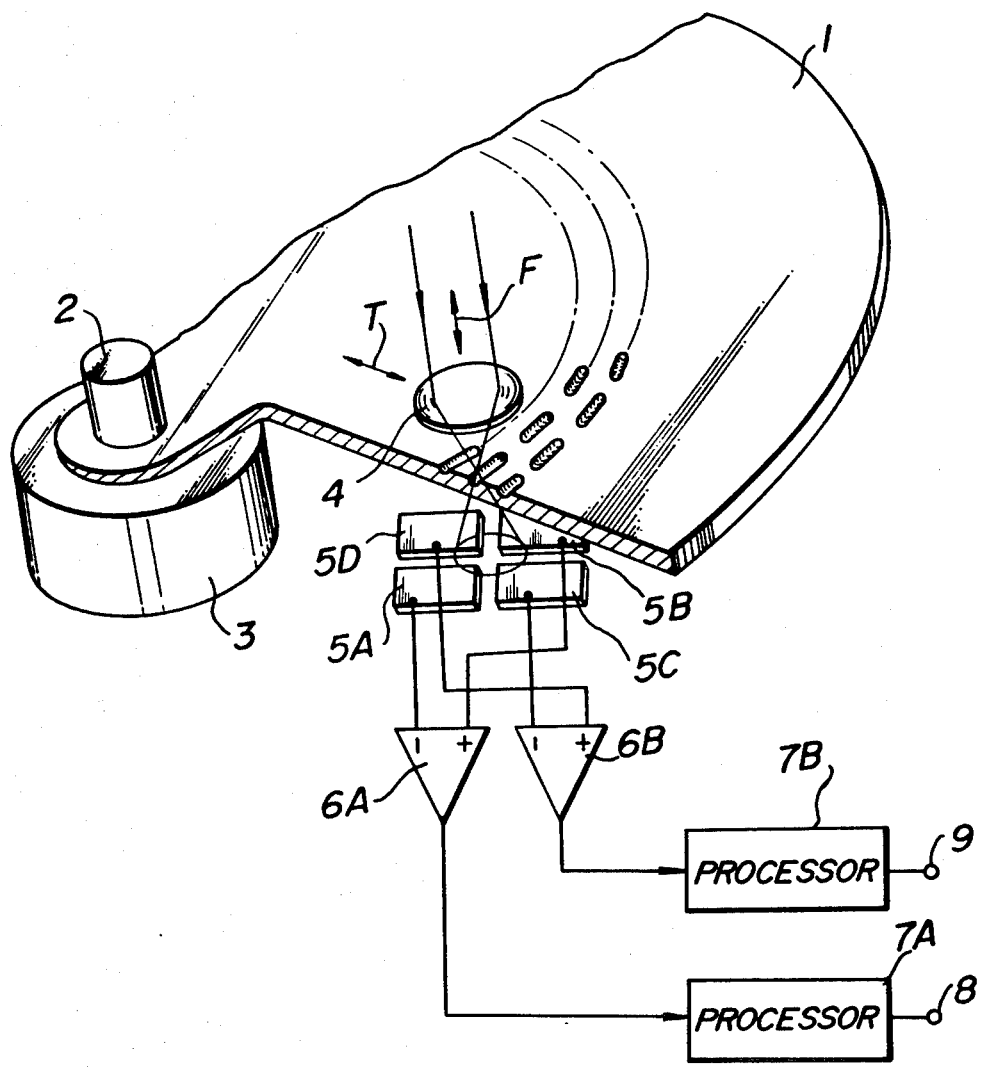
FIG. 1 is a perspective view showing an embodiment of known optical information reading system to which the present invention may be applied.

FIG. 1 shows an embodiment of known optical information reading system disclosed in the above mentioned U.S. Pat. No. 3,909,608, to which system the objective lens driving apparatus according to the invention can be advantageously applied. A disc-shaped record medium has a great number of information tracks. These tracks can be concentrically or spirally formed and information has been recorded along the tracks in the form of optical elements usually termed as "pits". The disc 1 is rotated about a spindle 2 coupled to a motor 3 at a very high speed of, for instance 1,800 rpm in case of a video disc of NTSC system. In order to reproduce the information optically recorded on the disc 1 a light beam emitted from, for example a laser light source is focussed by means of an objective lens 4 onto the disc 1 as a light spot of an extremely small diameter. In the embodiment shown in FIG. 1 the light ray passing through the disc 1 is modulated by the pits on the disc and impinges upon four photodetector elements 5A to 5D arranged symmetrically about an optical axis of objective lens 4. Output signals from the diagonally arranged photodetector elements 5A and 5B aligned in the track direction are supplied to a first differential amplifier 6A which produces a difference signal between these output signals. This difference signal is further supplied to a first processor 7A which produces a signal at an output 8. Output signals from the remaining photodetectors 5C and 5D are supplied to a second differential amplifier 6B and a difference signal from the differential amplifier is supplied to a second processor 7B which supplies a signal at a second output 9. Since the photodetectors 5A and 5B are aligned in the direction parallel to the information tracks, the signal appearing at the first output 8 represents the information signal which has been recorded on the disc 1, whereas the photodetectors 5C and 5D are arranged in a direction perpendicular to the information tracks, and thus the output signal at the second output 9 represents a deviation of the light spot with respect to the information tracks, i.e. a tracking error signal. Therefore when the objective lens 4 is moved in a radial direction shown by a double-headed arrow T in accordance with the tracking error signal, the light spot can trace accurately the information tracks and the information can be reproduced in a correct manner. On the other hand a focussing error signal may be derived by means of any one of various known methods and the light spot can be correctly focussed on the tracks by moving the objective lens 4 in the direction of its optical axis as illustrated by a double-headed arrow F by supplying the focussing error signal to a suitable electromechanical transducer.

It should be noted that the tracking error signal and/or the focussing error signal may be derived in various different ways and it is not essential for the present invention how to obtain these error signals.

FIGS. 2A to 2H are schematic views showing several embodiments of principal construction of a driving device of the objective lens driving apparatus according to the invention. In these figures and some other figures to be explained later, in order to show clearly a direction of a magnetic flux, coils are illustrated with being cut in a plane parallel to a plane of the drawing.

Figure 2A:
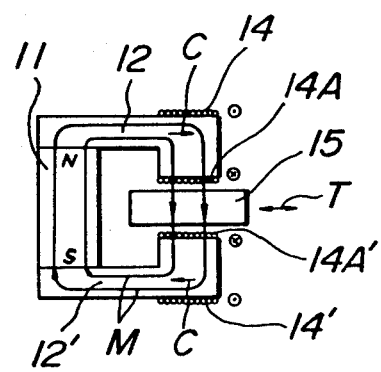
FIGS. 2A to 2H are schematic views illustrating several embodiments of a driving mechanism of an objective lens driving apparatus according to the invention.

In an embodiment illustrated in FIG. 2A first and second yokes made of magnetic material 12 and 12' forming first and second magnetic members are coupled with each other at their one end portions by means of a permanent magnet 11 forming a third magnetic member. In a space formed between the other end portions of first and second yokes 12 and 12' is arranged a movable member 15 made of magnetic material. The movable member 15 is arranged movably in a direction T which corresponds to the tracking direction T in FIG. 1. First and second coils 14 and 14' are wound on the first and second yokes 12 and 12', respectively at their other end portions facing the movable member 15. The first and second yokes 12 and 12', the permanent magnet 11 and the movable member 15 form a magnetic circuit and the permanent magnet 1 produces a constant magnetic flux through the magnetic circuit as illustrated by arrows M. Ignoring possible leakage of magnetic flux, only that portions 14A and 14A' of the coils 14 and 14', respectively which are opposed to each other are subjected to the magnetic flux M produced by the permanent magnet 11. In other words the magnetic flux M passing through the magnetic circuit intersects the coils 14 and 14' only at the portions 14A and 14A'. When a coil passing an electric current therethrough is placed in a magnetic field, the coil is subjected to a mechanical force. Therefore, when electric currents are supplied to the first and second coils 14 and 14' in such directions that the coil portions 14A and 14A' are subjected to the mechanical force in the same direction, the movable member 15 is moved in the direction T, because the coils 14 and 14' are wound on the fixedly arranged yokes 12 and 12', respectively and could not be moved. When the currents are supplied to the coils 14 and 14' in the directions illustrated symbolically in FIG. 2A, the movable member 15 is moved in the right-hand direction in FIG. 2A and an amount of this movement depends upon amplitudes of the currents. If the coils 14 and 14' are supplied with the currents of opposite directions, the movable member 15 is moved in the opposite direction i.e. in the left-hand direction. In this manner the movable member 15 can be moved in the direction T by supplying the currents to the coils 14 and 14' and the direction and amount of movement can be determined by the directions and amplitudes of the currents supplied to the coils, respectively. Therefore if the movable member 15 is arranged movably in the tracking direction T in conjunction with an objective lens and the coils 14 and 14' are supplied with the currents corresponding to the detected tracking error signal, the objective lens can be shifted in the tracking direction so as to cause the light spot formed by the objective lens to trace the information tracks in an accurate manner. According to the invention the apparatus can be easily made small in size and light in weight and nevertheless the sufficiently large force can be produced. Therefore the response of the apparatus is quite superior to the known apparatuses. Further a relation between the amount of the displacement and the amplitude of the currents supplied to the coils 14, 14' is made linear within a certain range of the amplitude of currents and thus a very accurate tracking control can be effected.

Figure 2B:
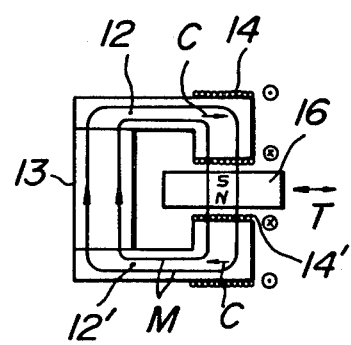

In an embodiment illustrated in FIG. 2B first and second yokes 12 and 12' are coupled with each other at their one end portions by means of a third yoke 13 made of magnetic material and a movable member 16 made of a permanent magnet is arranged between the first and second yokes 12 and 12' at their other end portions movably in the direction T. The movable member constitutes means for producing a constant magnetic flux through a magnetic circuit 12, 12', 13 and 16. Also in this embodiment the movable member 16 can be shifted in the direction T by supplying electric currents to first and second coils 14 and 14' wound on the first and second yokes 12 and 12', respectively at their other end portions.

Figure 2C:
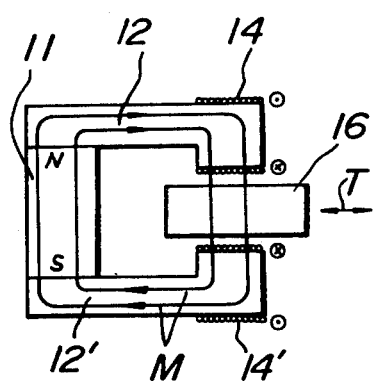

FIG. 2C shows another embodiment of the invention in which first and second yokes 12 and 12' are connected to each other at their one end portions by means of a permanent magnet 11 and a movable member 16 is also formed by a permanent magnet. First and second coils 14 and 14' are wound on the first and second yokes 12 and 12', respectively. In this embodiment the permanent magnets 11 and 16 are so arranged that they produce a constant magnetic flux M in the same direction through a magnetic circuit 11, 12, 12' and 16.

Figure 2D:
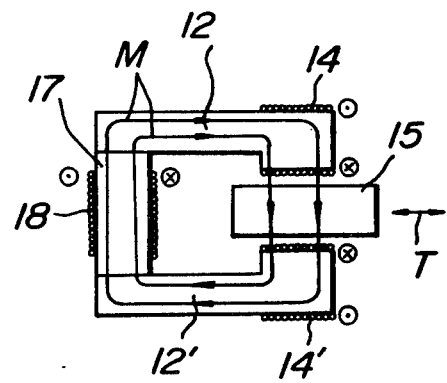

In an embodiment illustrated in FIG. 2D first and second magnetic yokes 12 and 12' are coupled with each other at their one end portions by means of a third magnetic member 17 on which a coil 18 is wound. The coil 18 is supplied with a direct current of constant amplitude in such a direction that the third member 17 is magnetized in a polarity shown in FIG. 2D. In this embodiment an electromagnet formed by the core 17 and coil 18 constitutes means for producing a constant magnetic flux M flowing through a magnetic circuit which is composed of the first, second and third magnetic members 12, 12' and 17 and a movable member 15 made of magnetic material. It should be noted that the movable member 15 may be formed by a permanent magnet which produces a magnetic flux having the same direction as that of the electromagnet 17, 18.

Figure 2E:
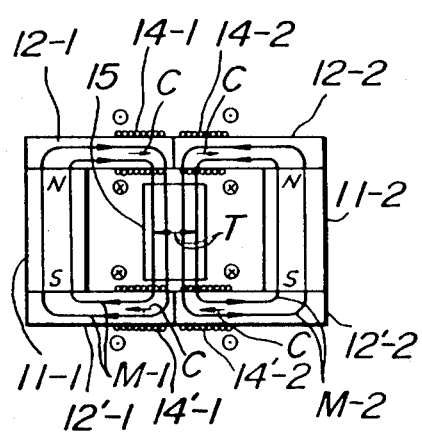

FIG. 2E shows still another embodiment of the driving apparatus according to the invention. In this embodiment a pair of the driving devices shown in FIG. 2A are arranged with end faces of the other end portions of the first and second magnetic members abutting each other. That is a first set is formed by first and second yokes 12-1 and 12'-1, a permanent magnet 11-1 coupling the first and second yokes with each other at their one end portions, and first and second coils 14-1 and 14'-1 wound on the first and second yokes, respectively, and a second set is formed by first and second yokes 12-2 and 12'-2, a permanent magnet 11-2 connecting the first and second yokes to each other at their one end portions, and first and second coils 14-2 and 14'-2 wound on the first and second yokes, respectively. A common movable member 15 made of magnetic material is arranged at a center in a space surrounded by the yokes 12-1, 12'-1, 12-2 and 12'-2 and permanent magnets 11-1 and 11-2. It should be noted that the member 15 is arranged movably in the tracking direction T. When the coils 14-1, 14'-1, 14-2 and 14'-2 are supplied with electric currents corresponding to the detected tracking error signal in the directions shown in FIG. 2E symbolically, the movable member 15 is subjected to a mechanical force in the tracking direction. In this embodiment a first magnetic circuit is formed by the yokes 12-1 and 12'-1, permanent magnet 11-1 and movable member 15 and a second magnetic circuit is constituted by the yokes 12-2 and 12'-2, permanent magnet 11-2 and the movable member 15. The permanent magnets 11-1 and 11-2 produce constant magnetic fluxes M-1 and M-2 flowing through the first and second magnetic circuits, respectively.

In a modification of the embodiment shown in FIG. 2E the first yokes 12-1 and 12-2 and the second yokes 12'-1 and 12'-2 of the first and second sets, respectively may be formed by single yokes, respectively. Further the first coils 14-1 and 14-2 and the second coils 14'-1 and 14'-2 may be constructed by single coils, respectively.

Figure 2F:
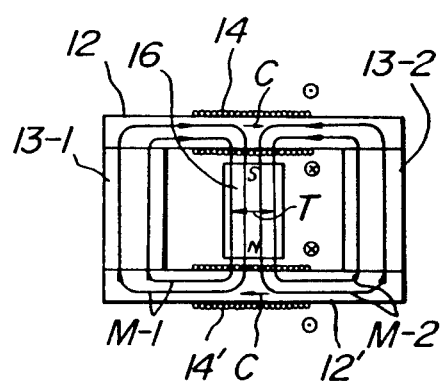

In an embodiment illustrated in FIG. 2F first and second yokes made of magnetic material 12 and 12' are coupled with each other at their both end portions by means of third and fourth yokes also made of magnetic material 13-1 and 13-2, respectively.

A movable member made of a permanent magnet 16 is arranged at a center in a space surrounded by these yokes and first and second coils 14 and 14' are wound on the first and second yokes 12 and 12', respectively at their middle portions. Thus these coils 14 and 14' face the movable member 16 which produces constant magnetic fluxes M-1 and M-2 flowing through first and second magnetic circuits, respectively. Since the magnetic fluxes M-1 and M-2 intersect the first and second coils 14 and 14' when the coils are supplied with electric currents corresponding to the tracking error signal, the movable member 16 is shifted in the tracking direction T.

Figure 2G:
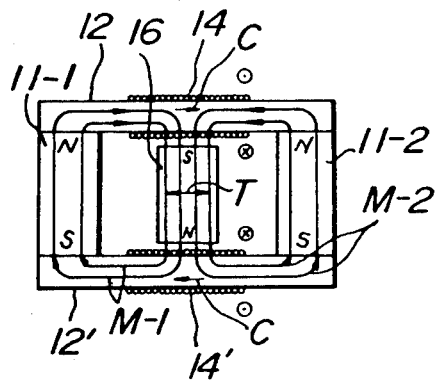

FIG. 2G shows a modified embodiment of the driving device illustrated in FIG. 2F. In this embodiment first and second yokes 12 and 12' made of magnetic material are connected to each other at their both end portions by means of third and fourth magnetic members 11-1 and 11-2 made of permanent magnets, respectively. A movable member 16 also made of a permanent magnet is disposed in a space surrounded by these magnetic members 12, 12', 11-1 and 11-2 so as to form first and second magnetic circuits through which constant magnetic fluxes M-1 and M-2 flow, respectively. First and second coils 14 and 14' are wound on the first and second yokes 12 and 12', respectively at their middle portions. When electric currents corresponding to the tracking error signals are flown through the coils in directions shown symbolically in FIG. 2G, the movable member 16 is subjected to a mechanical force and is shifted in the right-hand direction along the tracking direction T.

Figure 2H:
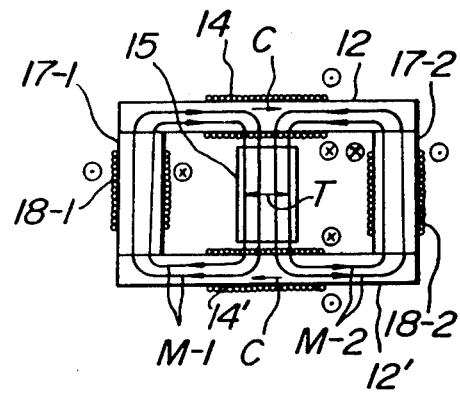

FIG. 2H shows still another embodiment of the driving device according to the invention. In this embodiment first and second magnetic members made of magnetic material 12 and 12' are coupled with each other at their both end portions by means of third and fourth magnetic members made of magnetic material 17-1 and 17-2 and a movable member 15 made of magnetic material is arranged movably in the direction T in a space surrounded by these magnetic members. First and second coils 14 and 14' are wound on the first and second yokes 12 and 12', respectively at their middle portions. Further coils 18-1 and 18-2 are wound on the third and fourth yokes 17-1 and 17-2, respectively so as to form electromagnets for producing constant magnetic fluxes M-1 and M-2 through first and second magnetic circuits. Also in this embodiment when the electric currents corresponding to the detected tracking error signal are supplied to the first and second coils 14 and 14', the movable member 15 can be shifted in the tracking direction T in a desired manner. In a modified embodiment the movable member 15 may be constituted by a permanent magnet.

In the embodiments shown in FIGS. 2A, 2B, 2C and D when the currents are supplied to the first and second coils 14 and 14' in the directions shown symbolically, magnetic fluxes are produced in the first and second yokes 12 and 12' in directions illustrated by arrows C. These magnetic fluxes C have the same directions as that of the constant magnetic flux M produced in the magnetic circuit by the magnetic flux producing means such as the permanent magnet and the electromagnet. Therefore an amount of the magnetic flux produced in the magnetic circuit is increased. On the other hand if the direction of the currents flowing through the coils 14 and 14' is reversed, the magnetic fluxes produced by the coils 14 and 14' have the directions opposite to that of the magnetic flux M. As the result the magnetic flux produced in the magnetic circuit becomes decreased. Therefore the relation between the amplitude of the currents passing through the coils 14 and 14' and the amount of displacement of the movable member 15 or 16 is made non-linear. However from the practical view point said relation may be assumed to be linear within a certain range of the current amplitude.

In the embodiments illustrated in FIGS. 2E, 2F, 2G and 2H, when the electric currents corresponding to the tracking error signal are supplied to the coils 14 and 14', magnetic fuxes having directions shown by arrows C are induced in the first and second yokes. These induced magnetic fluxes have the same direction as that of the constant magnetic flux M-1 in the first magnetic circuit, but has opposite direction to that of the magnetic flux M-2 in the second magnetic circuit. When the direction of the currents passing through the coils 14 and 14' is reversed, the above relation becomes inversed. Therefore a net magnetic flux produced in the first and second magnetic circuits does not vary at all and thus the relation between the amplitude of the currents and the amount of shift of the movable member 15 or 16 becomes linear. Further in these embodiments a greater amount of force for driving the movable member can be obtained, because a greater amount of magnetic flux can be flown through the movable member.

It should be noted that the present invention is not limited to the embodiments shown in FIGS. 2A to 2H, but many modifications may be conceived by those skilled in the art. For instance, at least one permanent magnet or an electromagnet may be provided at any portion in the magnetic circuit. Further a combination of a permanent magnet and an electromagnet may be used as the means for producing the constant magnetic flux through the magnetic circuit.

Figure 3:
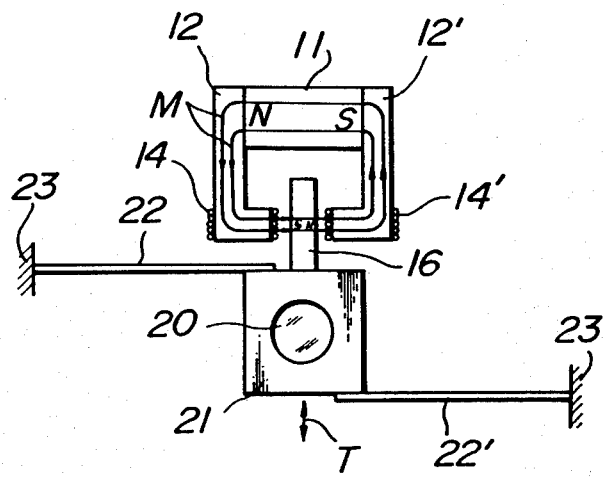
FIG. 3 is a plan view showing an embodiment of the driving apparatus according to the invention.

FIG. 3 shows a first embodiment of the objective lens driving apparatus according to the invention. In the present embodiment the driving device shown in FIG. 2C is utilized. That is to say first and second yokes 12 and 12' made of magnetic material and having a substantially L-shape are connected to each other at their top portions by means of a permanent magnet 11 and a movable member 16 made of a permanent magnet is arranged in a space between end faces of the bottom portions of first and second yokes 12 and 12' on which bottom portions are wound first and second coils 14 and 14', respectively in such a manner that a magetic flux M produced by the permanent magnets 11 and 14 through the magnetic circuit intersects the coils 14 and 14'. For the sake of clarity the coils 14 and 14' are shown as being cut in a plane perpendicular to an optical axis of an objective lens 20.

In this embodiment the objective lens 20 is secured to a lens holder 21 preferably made of non-magnetic material and the movable member 16 is fixed to the lens holder 21. The lens holder 21 is supported by a pair of leaf springs 22 and 22' in such a manner that the holder 21 and thus the lens 20 and movable members 16 can move in a tracking direction T. One ends of the leaf springs 22 and 22' are secured to the holder 21 and the other ends are connected to a fixed body 23 of the apparatus. The yokes 12 and 12' and the permanent magnet 11 are also secured to the fixed body. The leaf springs 22 and 22' are arranged symmetrically with respect to the optical axis of the objective lens. Further the yokes 12, 12', the permanent magnet 11 and the movable member 16 are arranged in a plane substantially perpendicular to the optical axis of lens 20.

When electric currents corresponding to a tracking error signal are supplied to the first and second coils 14 and 14', the movable member 16 is subjected to a mechanical force in the tracking direction T and thus the objective lens 20 is also shifted in the tracking direction T in such a manner that a light spot formed by the lens 20 can always trace information tracks on a record disc.

Figure 4:
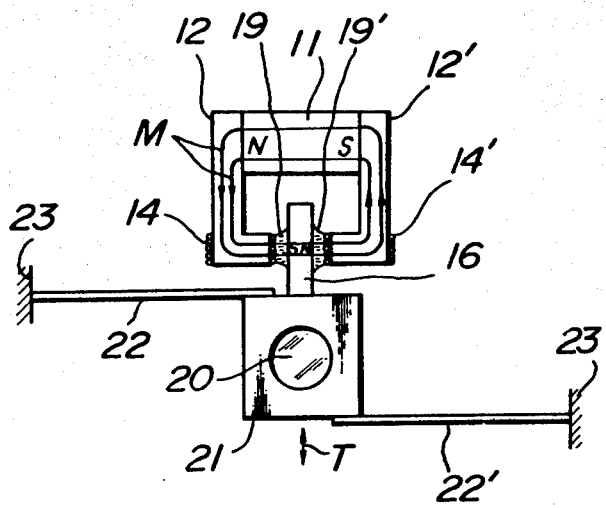
FIG. 4 is a plan view depicting another embodiment of the driving apparatus according to the invention.

FIG. 4 illustrates a modification of the embodiment of FIG. 3. In this modified embodiment gaps between the end faces of bottom portions of the L-shaped first and second magnetic members 12 and 12' and the movable member 16 are filled with magnetic fluids 19 and 19', respectively. The magnetic fluid may be commercially available under a trade name of "FERROFLUID" delivered by Ferrofluidics Company in U.S.A. In order to obtain a good response for the tracking correction the driving apparatus should have a suitable damping property. The magnetic fluids 19 and 19' filled in the gaps are stably remain in the gaps due to the strong magnetic field in the gaps. The magnetic fluids 19 and 19' have a viscosity suitable for producing the desired damping effect. In the present embodiment when the movable member 16 is moved in the tracking direction, the movable member is slightly rotated about the optical axis. Therefore the gaps between the yokes 12 and 12' and the movable member 16 are made somewhat widened in order that the movable member is not made in contact with the coils 14 and 14'. Since such wide gaps are filled with the magnetic fluids 19 and 19' a magnetic resistance at the gaps is decreased and the maximum amount of the magnetic flux M can flow through the magnetic circuit.

Figure 5:
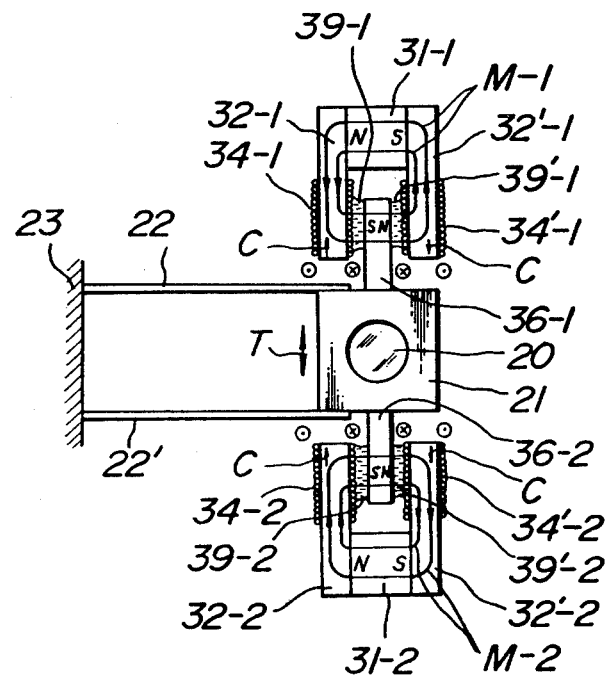
FIG. 5 is a plan view illustrating another embodiment of the driving apparatus according to the invention.

FIG. 5 illustrates another embodiment of the objective lens driving apparatus according to the invention. In this embodiment an objective lens 20 is secured to a lens holder 21 made of non-magnetic material and the holder 21 is supported movably substantially in the tracking direction T by means of a pair of leaf springs 22 and 22'. One ends of the leaf springs 22 and 22' are secured to the holder 21 and the other ends are connected to a fixed body 23. In this embodiment the leaf springs 22 and 22' extend in parallel with each other in a direction perpendicular to the tracking direction T and to an optical axis of the lens 20. To opposite sides of the holder 21 are secured first and second movable members 36-1 and 36-2 made of permanent magnets, respectively. The first movable member 36-1 is sandwiched by first and second rod-shaped yokes 32-1 and 32'-1 at their one end portions and these yokes are connected to each other by means of a third magnetic member 31-1 made of permanent magnet. On the first and second yokes 32-1 and 32'-1 are wound first and second coils 34-1 and 34'-1, respectively at the one end portions of the yokes. Gaps between the movable member 36-1 and the coils 34-1 and 34'-1 are filled with magnetic fluids 39-1 and 39'-1, respectively. The second movable member 36-2 is also interposed between fourth and fifth magnetic yokes 34-2 and 34'-2 of a rod-shape at their one end portions on which third and fourth coils 34-2 and 34'-2, respectively are wound. The yokes 32-2 and 32'-2 are coupled with each other at their other end portions by means of a sixth magnetic member 31-2 made of a permanent magnet. Further magnetic fluids 39-2 and 39'-2 are filled in gaps between the second movable members 36-2 and the third and fourth coils 34-2 and 34'-2, respectively.

In the present embodiment when the electric currents corresponding to the tracking error signal are supplied to the coils 34-1, 34'-1, 34-2 and 34'-2 in the directions shown symbolically in FIG. 5, the first and second movable members 36-1 and 36-2 are subjected to downward mechanical forces in the tracking direction T in a plane of FIG. 5, and thus the objective lens 20 is moved in the tracking direction T.

In the embodiment shown in FIG. 5, the permanent magnets 31-1, 31-2, 36-1 and 36-2 are so arranged that the magnetic flux M-1 produced by the magnets 31-1 and 36-1 has the direction opposite to that of magnetic fluxes C produced by the coils 34-1 and 34'-1, but the magnetic flux M-2 produced by the magnets 31-2 and 36-2 has the direction same as that of magnetic fluxes C generated by the coils 34-2 and 34'-2. Therefore as explained above with reference to FIGS. 2E to 2H, the influences of the magnetic fluxes C induced by the coils 34-1, 34'-1, 34-2 and 34'-2 upon the constant magnetic fluxes M-1 and M-2 are mutually compensated for and the relation between an amplitude of currents passing through the coils and an amount of the displacement of the objective lens 20 is made linear and thus an ideal response can be attained together with the damping action of the magnetic fluids 39-1, 39'-1, 39-2 and 39'-2.

In the embodiment shown in FIG. 3 magnetic fluids may be filled in gaps between the movable member 16 and the first and second yokes 14 and 14', respectively. Further the embodiments shown in FIGS. 4 and 5 the magnetic fluids 19 and 19' may be deleted. Even so, these driving devices can operate correctly. Moreover, in the embodiments shown in FIGS. 3, 4 and 5 the driving mechanism illustrated in FIG. 2C is adopted, but it is a matter of course that the other driving mechanisms shown in FIGS. 2A, 2B, 2D to 2H and their modifications may be also utilized. When the driving mechanisms illustrated in FIGS. 2E to 2H are used, the movable member 15 or 16 is rigidly coupled to the objective lens 20 or its holder by means of a suitable link mechanism. Further in the embodiments shown in FIGS. 3, 4 and 5 the leaf springs 22 and 22' extend perpendicularly to the optical axis, but may be arranged in parallel with the optical axis.

Figure 6A:
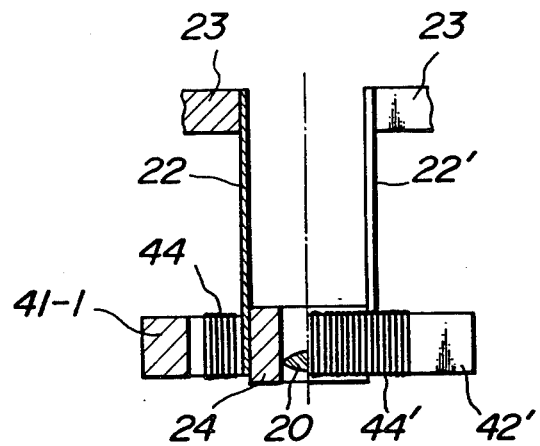

FIGS. 6A and 6B illustrate still another embodiment of the objective lens driving apparatus according to the invention. In the drawings a left hand half is shown as cross sectional views. In this embodiment first and second magnetic members 42 and 42' made of magnetic material are coupled with each other at their both end portions by means of third and fourth magnetic members 41-1 and 41-2, respectively made of permanent magnets. On the first and second yokes 42 and 42' are wound first and second coils 44 and 44', respectively at their middle portions. An objective lens 20 is secured to a lens holder 24 made of magnetic material. In this embodiment the lens holder 24 serves also as a movable member. The lens holder 24 is suspended from a fixedly arranged body of the apparatus by means of a pair of leaf springs 22 and 22' which extend in parallel with an optical axis of the objective lens 20. Further magnetic fluids 49 and 49' are filled in gaps formed between the lens holder 24 and the coils 44 and 44'. In this embodiment when the electric currents corresponding to the detected tracking error signal are flown through the first and second coils 44 and 44', the objective lens 20 is displaced in the tracking direction T. It should be noted that also in this embodiment the relation between an amplitude of the currents and an amount of displacement of the lens 20 is maintained linear.

FIGS. 7A and 7B show another embodiment similar to the previous embodiment of FIGS. 6A and 6B. In this embodiment first and second yokes 52 and 52' made of magnetic material are coupled with each other by means of third and fourth yokes 53 and 53' made of magnetic material. An objective lens 20 is fixed in a lens holder 25 made of permanent magnet which produces constant magnetic fluxes M-1 and M-2 through first and second magnetic circuits. The holder 25 is hung from a fixed body 23 by means of a pair of leaf springs 22 and 22' arranged symmetrically with respect to an optical axis of objective lens 20.

First and second coils 54 and 54' are wound on the first and second yokes 52 and 52', respectively at their middle portions. When the currents corresponding to the tracking error signal are supplied to the coils 54 and 54', the lens holder 25 and thus the lens 20 are moved in the tracking direction T.

In the embodiments illustrated in FIGS. 6A, 6B, 7A and 7B the driving mechanisms shown in FIGS. 2E, 2G and 2H and their modified embodiments may be equally utilized. Further the magnetic fluids may also be deleted, if any.

Figure 8A:
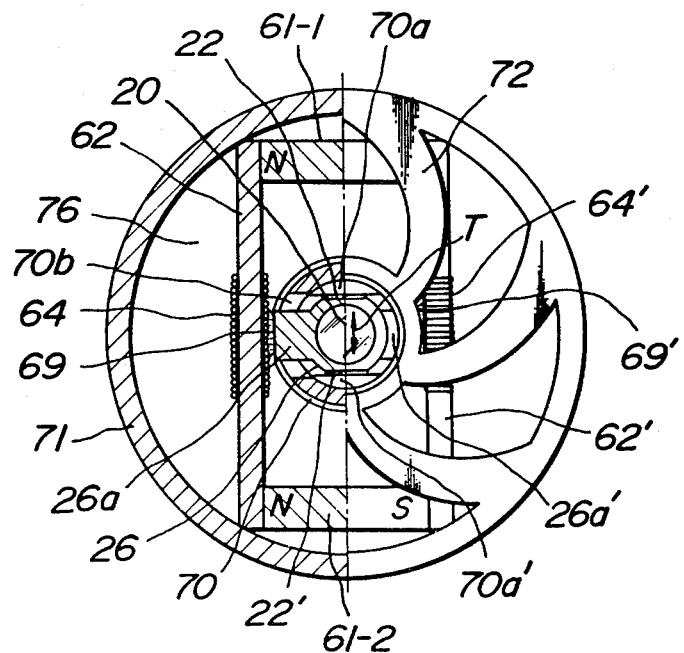
FIGS. 8A and 8B are plan and side views showing still another embodiment of the driving apparatus according to the invention, in which an objective lens is moved two-dimensionally, in these figures a left-hand half being cut.
Figure 8B:
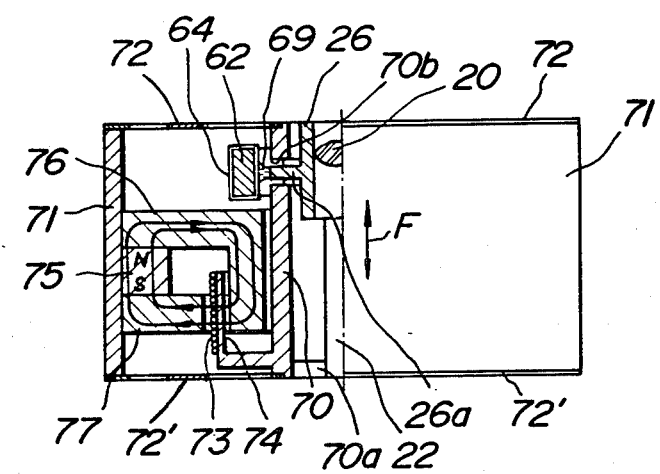

FIGS. 8A and 8B show still another embodiment of the objective lens driving apparatus according to the invention. In this embodiment an objective lens 20 is shifted in a focussing direction F as well as in a tracking direction T. That is to say the objective lens 20 is arranged movably two-dimensionally, i.e. in the focussing direction F of its optical axis and in the tracking direction T perpendicular to the optical axis and the track direction. The objective lens 20 is fixed in a tubular lens holder 26 made of magnetic material. The lens holder 26 is supported by a pair of leaf springs 22 and 22' which extend upright in parallel with each other symmetrically with respect to the optical axis of the lens 20. Lower ends of the leaf springs 22 and 22' are secured to projections 70a and 70a' formed integrally with a cylindrical body 70 at its lower end portion. The body 70 serves as an intermediate member for supporting the lens 20 movably in the tracking direction T. The cylindrical body 70 is made of non-magnetic material and has formed therein a pair of slots (in the drawing only one slot 90b is shown) at its upper portion which surrounds the lens holder 26. The slots are formed symmetrically with respect to the optical axis of lens 20. The lens holder 26 which also serves as a movable member has formed integrally therewith a pair of projections 26a and 26a' which project from the cylindrical body 70 through the slots 70b. First and second magnetic members 62 and 62' connected to each other at both end portions by means of permanent magnets 61-1 and 61-2 are arranged around the cylindrical body 70 in such a manner that middle portion of the first and second magnetic members 62 and 62' face the first and second projections 26a and 26a' of lens holder 26. On the first and second yokes 62 and 62' are wound first and second coils 64 and 64' at their middle portions and gaps between the first and second coils 64 and 64' and the first and second projections 26a and 26a', respectively are filled with magnetic fluids 69 and 69'. The apparatus further comprises an outer cylindrical body 71 arranged coaxially with the intermediate cylindrical body 70. These cylindrical bodies 70 and 71 have substantially same axial lengths and are coupled with each other at their upper and lower ends by means of a pair of generally disc-shaped leaf springs 72 and 72', respectively in such a manner that the intermediate cylindrical body 70 and thus the lens 20 can move in the focussing direction F. As clearly shown in FIG. 8A the disc-shaped leaf springs 72 and 72' have a plurality of spiral arms, so that the intermediate cylindrical body 70 moves in the focussing direction F while it rotates or twists slightly about the optical axis. The magnetic members 61-1, 61-2, 62 and 62' are secured to the outer cylindrical frame 71 by means of suitable connecting means not shown. Therefore to the intermediate cylindrical body 1 are only secured the lens holder 26, the lens 20 and the leaf springs 22 and 22', and thus the assembly moving in the focussing direction F can be made extremely light in weight and small in size.

In order to move the intermediate cylindrical frame 70 and thus the lens 20 in the focussing direction F, a moving coil 73 is wound on a ring 74 formed integrally with the intermediate cylindrical frame 70 and a ring-shaped permanent magnet 75 and ring-shaped yokes 76 and 77 are arranged in a space between the intermediate and outer cylindrical bodies 70 and 71.

When electric currents corresponding to the detected tracking error signal are supplied to the first and second coils 64 and 64', the lens holder 26 and thus the objective lens 20 are moved in the tracking direction T. When an electric current corresponding to the detected focussing error signal is supplied to the moving coil 73, the moving coil 73 is subjected to a mechanical force in the focussing direction F, and thus the intermediate cylindrical body 70, the leaf springs 22, 22', the lens holder 26 and the objective lens 20 are moved in the focussing direction F. In this manner the objective lens 20 can be shifted in the tracking direction T as well as in the focussing direction F and thus the light spot formed by the objective lens 20 can be correctly focussed onto the information track and can trace the center of the information track.

In such a construction, since the objective lens 20 can be displaced in both the tracking and focussing directions without being tilt, the optical axis of objective lens 20 can be always made in parallel with the incident light ray. Therefore the objective lens may be made light in weight and inexpensive, because the objective lens can be designed with only taking into account on-axis abbreviations.

In the present embodiment the relation between an amplitude of the currents flowing through the coils 64 and 64' and an amount of the displacement of the objective lens 20 becomes linear, so that the tracking control can be carried out in an extremely accurate manner.

As in the embodiment shown in FIGS. 6A and 6B the magnetic fluids 69 and 69' filled in the gaps between the projections 26a and 26a' and the coils 64 and 64', respectively serve to provide a damping action upon the movement of the lens holder 26 in the tracking direction T. In the present embodiment the magnetic fluids also serves to effect a damping action upon the movement of the lens holder 26 in the focussing direction to some extent. In the tracking control only the lens 20 and lens holder 26 are moved and a weight w of these parts amounts only to about 0.5 grammes. Therefore a spring constant k of the leaf springs 22 and 22' should be determined to satisfy the following equation;

$$f_0 = \frac{1}{2\pi} \sqrt{\frac{k}{w}} = 30 \text{ Hz}$$

wherein $f_0$ is a resonant frequency and the video disc is to be rotated at 1,800 rpm. Whereas in the focussing control the lens 20, holder 26, leaf springs 22, 22', intermediate cylindrical body 70, ring 74 and moving coil 73 are moved and a weight W of these elements is about 3 grammes. Thus a spring constant K of the disc-shaped springs 72 and 72' should have such a value that they have a resonance frequency $F_0$ defined by an equation, $$F_0 = \frac{1}{2\pi} \sqrt{\frac{K}{W}} = 30 \text{ Hz}.$$

In order to satisfy the above mentioned two conditions, the spring constant K of the disc-shaped springs 72 and 72' should be larger than the spring constant k of the leaf springs 22 and 22' by about six times. Therefore the damping action in the focussing direction F due to the magnetic fluids 69 and 69' is smaller than that in the tracking direction by about six times. In order to supplement the damping action in the focussing direction F it is preferable to provide any other damping mechanism. In the embodiment shown in FIGS. 8A and 8B an electromagnetic damping action is utilized. Since the permanent magnet 75 may be strong enough to obtain a sufficiently large electromagnetic damping in the focussing direction, a desired damping property can be attained. On the other hand the electromagnetic damping in the tracking direction is smaller than that in the focussing direction. Therefore the gaps are filled with the magnetic fluids so as to obtain the desired damping effect in the tracking direction. However in the focussing direction in which the desired damping action has been attained, the magnetic fluids do not affect the desired damping property, and serve to provide the desired damping property in the tracking direction. Further as explained above the disc-shaped springs 72 and 72' having the spiral arms can allow the movement of the lens 20 in the focussing direction F, while the lens 20 and thus the lens holder 26 are slightly rotated about the optical axis of the objective lens 20. Therefore the gaps between the projections 26a and 26a' and the coils 64 and 64', respectively should be made relatively wider in order that they do not come in contact with each other The magnetic fluids 69 and 69' are filled in these relatively wide gaps, so that the magnetic fluids can serve to utilize the magnetic fluxes to the maximum extent.

In the embodiment shown in FIGS. 8A and 8B the driving device illustrated in FIG. 2E is used, but any other driving devices in FIGS. 2A to 2D and 2F to 2H and their modified embodiments may be equally installed in the focussing mechanism.

Figure 9:
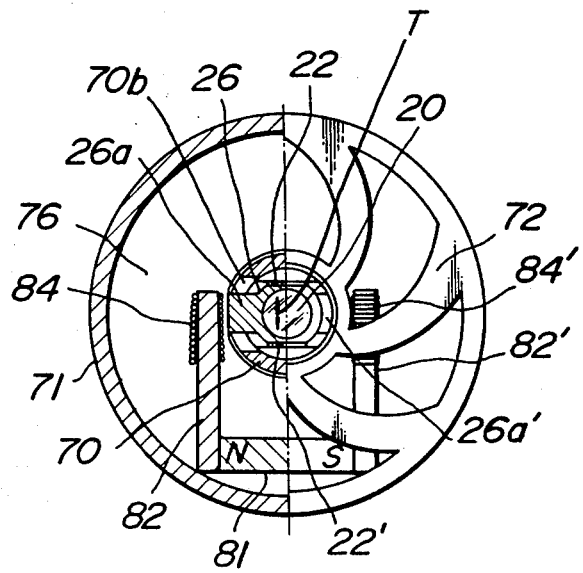
FIGS. 9 and 10 are plan views depicting two modifications of the embodiment shown in FIGS. 8A and 8B, in these figures a left-hand half being also shown as cross section.
Figure 10:
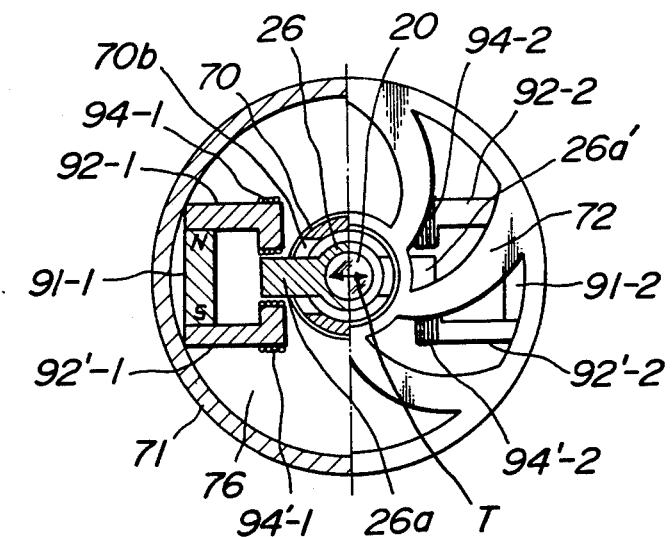

FIGS. 9 and 10 illustrate two modifications of the embodiment shown in FIGS. 8A and 8B. In these modified embodiment the driving device of FIG. 2A is utilized. In FIGS. 9 and 10 correspondings elements to those shown in FIGS. 8A and 8B are denoted by the same reference numerals as those in FIGS. 8A and 8B, and a focussing mechanism which may be similar to that shown in FIGS. 8A and 8B is deleted from the drawing.

In the embodiment illustrated in FIG. 9 a tubular lens holder 26 made of magnetic material has also two projections 26a and 26a' and first and second magnetic members 82 and 82' made of magnetic material are coupled with each other at their one end portions by means of a third magnetic member 81 made of a permanent magnet. The other end portions !, of the first and second magnetic members 82 and 82' are opposed to the end faces of projections 26a and 26a', respectively and are provided with first and second coils 84 and 84'. The magnetic members 82, 82' and 81 are secured to an outer cylindrical body 71.

In the embodiment shown in FIG. 10 a first projection 26a of a lens holder 26 is interposed in a space between one end portions of first and second magnetic members 92-1 and 92'-1 which are connected to each other at their other end portions by means of a third magnetic member 91-1 made of a permanent magnet. On the one end portions of first and second magnetic yokes 92-1 and 92'-1 are wound first and second coils 94-1 and 94'-1, respectively. A second projection 26a' of the lens holder 26 are inserted between one end portions of fourth and fifth magnetic members 92-2 and 92'-2 on which portions are wound third and fourth coils 94-2 and 94'-2, respectively. The fourth and fifth magnetic yokes 92-2 and 92'-2 are coupled with each other at their other end portions by means of sixth magnetic member 91-2 made of a permanent magnet.

In the embodiments shown in FIGS. 9 and 10 the gaps between the movable member and the first and second yokes, respectively may be filled with magnetic fluids.

Figure 11A:
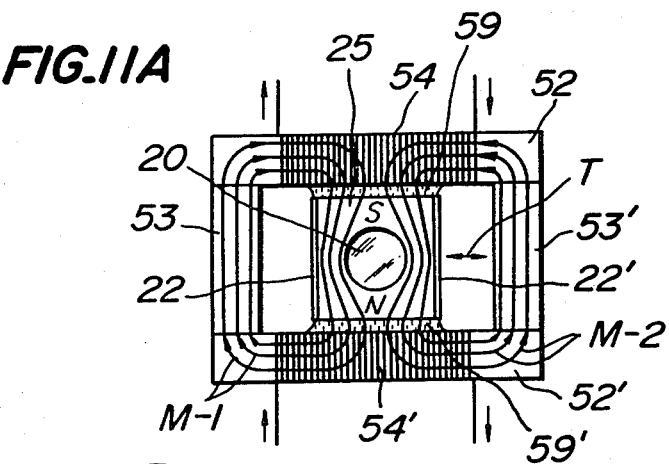
FIGS. 11A, 11B and 11C are plan views illustrating still another embodiment of the driving apparatus according to the invention.
Figure 11B:
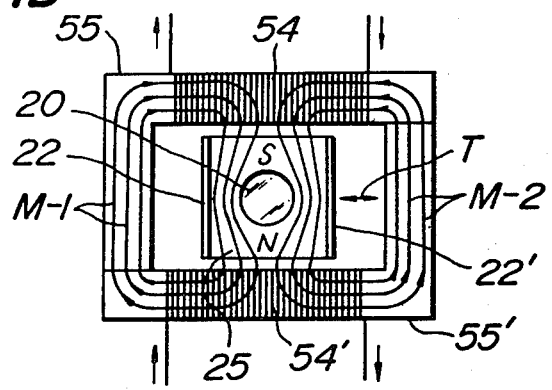
Figure 11C:
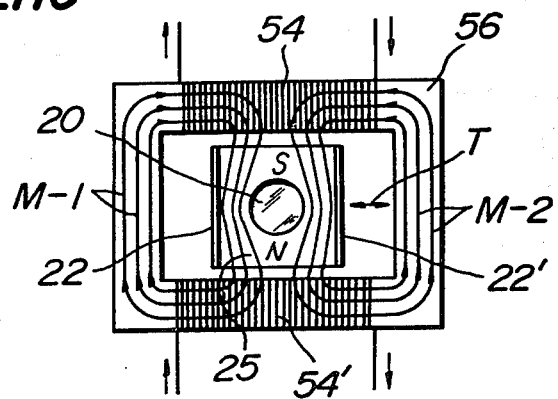

FIGS. 11A, 11B and 11C show three modifications of the embodiment shown in FIGS. 7A and 7B and corresponding elements are denoted by the same reference numerals as those in FIGS. 7A and 7B. In the embodiment of FIG. 11A a lens holder 25 serving as a movable member is made of a permanent magnet and is surrounded by first, second, third and fourth rod-shaped magnetic members 52, 52', 53 and 53'. Gaps between the lens holder 25 and first and second magnetic members 52 and 52' are filled with magnetic fluids 59 and 59' so as to attain a desired damping action. In the embodiment shown in FIG. 11B first and third magnetic members are integrally formed as an L-shaped member 55 and second and fourth magnetic members are also integrally made as an L-shaped member 55'. These members 55 and 55' are assembled as shown in the drawing and a movable member 25 made of a permanent magnet is arranged in a space defined by the magnetic members 55 and 55'. An objective lens 20 is secured to the movable member 25 as in the previous embodiment. In the embodiment shown in FIG. 11C first, second, third and fourth magnetic members are all formed integrally as a single rectangular ring-shaped member 56. A movable member 25 made of a permanent magnet and holding an objective lens 20 is arranged inside the member 56 movably in the tracking direction T by means of a pair of leaf springs 22 and 22' extending in the direction in the optical axis of objective lens 20.

It should be noted that the present invention is not limited to the embodiments explained above, but may be easily modified in various ways within the scope of the invention.

What is claimed is:

1. An apparatus for driving an objective lens for correcting a relative positional error, i.e., a tracking error between an information track recorded spirally or concentrically on a record medium and a light spot projected onto the record medium by means of the objective lens comprising means for supporting the objective lens movably in a tracking direction perpendicular to an optical axis of the objective lens as well as to the information track;

a movable member made of magnetic material and arranged movably in the tracking direction in conjunction with the objective lens;

first and second magnetic members made of magnetic material and arranged in such a manner that the movable member is interposed therebetween via gaps viewed in a direction substantially perpendicular to the tracking direction to form together with the movable member a magnetic circuit passing through the first magnetic member, the gap between the first magnetic member and movable member, the movable member, the gap between the movable member and second magnetic member, and the second magnetic member;

means arranged in part of the magnetic circuit for producing a constant magnetic flux through the magnetic circuit; and first and second coils would on the first and second magnetic members, respectively, at portions opposite to the movable member for producing a magnetic flux in the first and second magnetic member portions substantially in parallel with the tracking direction; whereby said first and second coils are supplied with signals corresponding to a tracking error signal representing the tracking error so as to move the movable member and thus the objective lens in the tracking direction.

2. An apparatus according to claim 1, wherein the gaps between the first and second magnetic members and the movable members are filled with magnetic fluid.

3. An apparatus according to claim 1, wherein the first and second magnetic members are so arranged with respect to the movable member that the movable member is interposed therebetween at their one end portions on which the first and second coils are wound, respectively, and the apparatus further comprises a third member made of magnetic material for coupling the first and second magnetic members with each other at their other end portions.

4. An apparatus according to claim 3, wherein said magnetic flux producing means is constituted by the third magnetic member made of a permanent magnet.

5. An apparatus according to claim 3, wherein the magnetic flux producing means comprises a permanent magnet constituting at least a part of the movable member.

6. An apparatus according to claim 3, wherein the magnetic flux producing means comprises a first permanent magnet constituting the third magnetic member and a second permanent magnet constituting at least a part of the movable member.

7. An apparatus according to claim 3, wherein the magnetic flux producing means comprises an electromagnet coil wound on the third magnetic member.

8. An apparatus according to claim 3, wherein the first, second and third magnetic members are formed as individually separated parts.

9. An apparatus according to claim 5, wherein the third magnetic member is formed integrally with at least one of the first and second magnetic members.

10. An apparatus according to claim 3, wherein the objective lens is secured in a lens holder which is rigidly coupled with the movable member by means of a rigid coupling rod and the holder is secured to the resiliently supporting member.

11. An apparatus according to claim 3, wherein the objective lens is secured to the movable member which also serves as a lens holder.

12. An apparatus according to claim 3, wherein the gaps between the first and second magnetic members and the movable member are filled with magnetic fluid.

13. An apparatus according to claim 3, wherein the first, second and third magnetic members and the movable member are arranged substantially in a plane perpendicular to the optical axis of objective lens.

14. An apparatus according to claim 3, wherein the objective lens supporting means comprises a pair of leaf springs extending in parallel with the optical axis and substantially perpendicularly to the tracking direction, one ends of the leaf springs are secured to a holder supporting the objective lens, and the other ends of leaf springs are secured to a part of the apparatus which is fixedly arranged relative to the objective lens.

15. An apparatus according to claim 14, wherein the pair of leaf springs are arranged symmetrically with respect to the optical axis of objective lens.

16. An apparatus according to claim 15, wherein the leaf springs are arranged vertically and the lens holder is secured to upper end portions of the leaf springs.

17. An apparatus according to claim 15, wherein the leaf springs are arranged vertically and the lens holder is secured to the lower end portions of leaf springs.

18. An apparatus according to claim 3, wherein, objective lens supporting means comprises a pair of leaf springs extending perpendicularly to the optical axis of objective lens as well as to the tracking direction, one ends of leaf springs are secured to a holder supporting the objective lens, and the other ends of leaf springs are secured to a part of the apparatus which is fixedly arranged relative to the objective lens.

19. An apparatus according to claim 18, wherein the leaf springs are arranged symmetrically with respect to the optical axis of objective lens.

20. An apparatus according to claim 18, wherein the leaf springs are arranged in parallel with each other and symmetrically with respect to a plane which includes the optical axis and is perpendicular to the tracking direction.

21. An apparatus according to claim 13, in order to correct a variation in a distance between the objective lens and information track further comprising a focussing mechanism which comprises
an intermediate member with which the objective lens is coupled by means of said supporting means;
second supporting means for supporting the intermediate member movable in a focussing direction in parallel with the optical axis of objective lens with respect to a fixed body of the apparatus; and
means for driving the intermediate member and thus the supporting means, objective lens and movable member in the focussing direction in response to a focussing error signal corresponding to the variation in said distance; whereby the first, second and third magnetic members are secured to the fixed body of apparatus.

22. An apparatus according to claim 21, wherein the intermediate member is formed by a hollow cylindrical body extending in the direction of the optical axis of objective lens and the objective lens is arranged inside the intermediate cylindrical body movably in the tracking direction.

23. An apparatus according to claim 22, wherein the means for supporting the objective lens comprises a pair of leaf springs extending inside the cylindrical body in the direction of the optical axis of objective lens, one ends of the leaf springs are secured to the objective lens and the other ends of the leaf springs are secured to an end portion of the cylindrical body.

24. An apparatus according to claim 23, wherein the cylindrical body is arranged vertically, the objective lens is arranged inside the cylindrical body near its upper end portion and the other ends of leaf springs are secured to the cylindrical body at its lower end portion.

25. An apparatus according to claim 23, wherein the objective lens is secured to the movable member arranged inside the cylindrical body made of non-magnetic material and having a projection made of magnetic material which protrudes outside the cylindrical body through a slot formed in the cylindrical body in a direction substantially in parallel with the tracking direction and the first and second magnetic members are so arranged that the projection is sandwiched therebetween in the direction substantially perpendicular to the tracking direction.

26. An apparatus according to claim 24, wherein the objective lens is secured to the movable member arranged inside the cylindrical body made of non-magnetic material and having a projection made of magnetic material which protrudes outside the cylindrical body through a slot formed in the cylindrical body in a direction substnatially in parallel with the tracking direction and the first and second magnetic members are so arranged that the projection is sandwiched therebetween in the direction substantially perpendicular to the tracking direction.

27. An apparatus according to claim 23, wherein the objective lens is secured to the movable member arranged inside the cylindrical body made of non-magnetic material and having a pair of projections made of magnetic material which protrude outside the cylindrical body through slots formed in the cylindrical body in a direction substnatially perpendicular to the tracking direction and the first and second magnetic members are so arranged that these projections are opposed to the one end portions of the first and second magnetic members, respectively.

28. An apparatus according to claim 22, wherein the means for driving the cylindrical body made of non-magnetic material in the focussing direction comprises a voice coil wound on a ring-like member connected to the cylindrical body and a magnet assembly which includes a permanent magnet and is secured to the fixed body for producing a magnetic flux passing through the voice coil, and the voice coil is supplied with a signal corresponding to a focussing error signal representing the variation in the distance so as to move the cylindrical body and thus the objective lens in the focussing direction.

29. An apparatus according to claim 28, wherein the fixed part of the apparatus is formed by an outer cylindrical body made of non-magnetic material and arranged outside and coaxially with the intermediate cylindrical body and the means for supporting the intermediate cylindrical body comprises a pair of leaf spring members arranged between the intermediate cylindrical body and the outer cylindrical body at their upper and lower ends, respectively.

30. An apparatus according to claim 29, wherein each of the pair of leaf springs is formed by a generally disc-shaped leaf spring having a plurality of spiral arms.

31. An apparatus according to any one of claims 25, 26 and 27, wherein the gaps between the projection or projections of movable member and the first and second magnetic members are filled with magnetic fluid.

32. An apparatus according to claim 3, further comprising
fourth and fifth magnetic members made of magnetic material and arranged so that the movable member is interposed therebetween via gaps at their one end portions;
a sixth magnetic member made of magnetic material for coupling the fourth and fifth magnetic members with each other at their other end portions so as to form a second magnetic circuit together with the fourth and fifth magnetic members and the movable member;
third and fourth coils wound on the one end portions of the fourth and fifth magnetic members, respectively; and
second means arranged in part of the second magnetic circuit for producing a constant magnetic flux through the second magnetic circuit; whereby the third and fourth coils are supplied with signals corresponding to the tracking error signal.

33. An apparatus according to claim 32, wherein said first and second magnetic flux producing means are constituted by the third and sixth magnetic members made of a permanent magnet, respectively.

34. An apparatus according to claim 32, wherein each of the first and second magnetic flux producing means comprises a permanent magnet constituting at least a part of the movable member.

35. An apparatus according to claim 32, wherein the first magnetic flux producing means comprises a first permanent magnet constituting the third magnetic member and a second permanent magnet constituting at least a part of the movable member and the second magnetic flux producing means comprises a third permanent magnet constituting the sixth magnetic member and a fourth permanent magnet constituting at least a part of the movable member.

36. An apparatus according to claim 32, wherein the first and second magnetic flux producing means comprise electromagnet coils would on the third and sixth magnetic members, respectively.

37. An apparatus according to claim 32, wherein the first, second, third, fourth, fifth and sixth magnetic members are formed as individually separated parts.

38. An apparatus according to claim 34, wherein the third magnetic member is formed integrally with at least one of the first and second magnetic members and the sixth magnetic member is formed integrally with at least one of the fourth and fifth magnetic members.

39. An apparatus according to claim 32, wherein the objective lens is secured in a lens holder which is rididly coupled with the movable member by means of a rigid coupling rod and the holder is secured to the resiliently supporting member.

40. An apparatus according to claim 32, wherein the objective lens is secured to the movable member which also serves as a lens holder.

41. An apparatus according to claim 40, wherein the movable member comprises the lens holder made of non-magnetic material and first and second projections made of magnetic material and secured to the lens holder symmetrically with respect to the optical axis of objective lens.

42. An apparatus according to claim 32, wherein the gaps between the first, second, fourth and fifth magnetic members and the movable member are filled with magnetic fluid.

43. An apparatus according to claim 41, wherein the gaps between the first and second magnetic members, and the fourth and fifth magnetic members and the first and second projections of movable member, respectively are filled with magnetic fluid.

44. An apparatus according to claim 40, wherein the first, second, third, fourth, fifth and sixth magnetic members and the movable member are arranged substantially in a plane perpendicular to the optical axis of objective lens in such a manner that the magnetic members surround the objective lens secured in the movable member.

45. An apparatus according to claim 41, wherein the first, second, third, fourth, fifth and sixth magnetic members and the movable member are arranged substantially in a plane perpendicular to the optical axis of objective lens in such a manner that the first, second and third magnetic members and the fourth, fifth and sixth magnetic members surround the first and second projections, respectively, of the movable member.

46. An apparatus according to claim 45, wherein the first and second projections are made of permanent magnets constituting at least part of the first and second magnetic flux producing means, respectively.

47. An apparatus according to claim 32, wherein the objective lens supporting means comprises a pair of leaf springs extending in parallel with the optical axis of objective lens and substantially perpendicularly to the tracking direction, one ends of the leaf springs are secured to a holder supporting the objective lens, and the other ends of leaf springs are secured to a part of the apparatus which is fixedly arranged relative to the objective lens.

48. An apparatus according to claim 47, wherein the pair of leaf springs are arranged symmetrically with respect to the optical axis of objective lens.

49. An apparatus according to claim 48, wherein the leaf springs are arranged vertically and the lens holder is secured to the upper end portions of leaf springs.

50. An apparatus according to claim 48, wherein the leaf springs are arranged vertically and the lens holder is secured to the lower end portions of leaf springs.

51. An apparatus according to claim 32, wherein the objective lens supporting means comprises a pair of leaf springs extending perpendicularly to the optical axis of objective lens as well as to the tracking direction, one ends of leaf springs are secured to a holder supporting the objective lens, and the other ends of leaf springs are secured to a part of the apparatus which is fixedly arranged relative to the objective lens.

52. An apparatus according to claim 51, wherein the leaf springs are arranged symmetrically with respect to the optical axis of objective lens.

53. An apparatus according to claim 51, wherein the leaf springs are arranged in parallel with each other and symmetrically with respect to a plane which includes the optical axis and is perpendicular to the tracking direction.

54. An apparatus according to any one of claims 44, 45 and 46, in order to correct a variation in a distance between the objective lens and information track further comprising a focussing mechanism which comprises
an intermediate member with which the objective lens is coupled by means of the supporting means;
second supporting means for supporting the intermediate member movably in a focussing direction in parallel with the optical axis of objective lens with respect to a fixed body of the apparatus; and
means for driving the intermediate member and thus the supporting means, objective lens and movable member in the focussing direction in response to a focussing error signal corresponding to the variation in said distance; whereby the first, second, third fourth, fifth and sixth magnetic members are secured to the fixed body of apparatus.

55. An apparatus according to claim 54, wherein the intermediate member is formed by a hollow cylindrical body extending in the direction of the optical axis of objective lens and the objective lens is arranged inside the intermediate cylindrical body movably in the tracking direction.

56. An apparatus according to claim 55, wherein the means for supporting the objective lens comprises a pair of leaf springs extending inside the cylindrical body in the direction of the optical axis of objective lens, one ends of the leaf springs are secured to the objective lens and the other ends of the leaf springs are secured to an end portion of the cylindrical body.

57. An apparatus according to claim 56, wherein the cylindrical body is arranged vertically, the objective lens is arranged inside the cylindrical body near its upper end portion and the other ends of leaf springs are secured to the cylindrical body at its lower end portion.

58. An apparatus according to claim 56, wherein the objective lens is secured to the movable member arranged inside the cylindrical body made of non-magnetic material, the movable member comprises first and second projections made of magnetic material and protruding outside the cylindrical body through slots formed in the cylindrical body in a direction substantially in parallel with the tracking direction, the first and second magnetic members and the fourth and fifth magnetic members are so arranged that the first and second projections are sandwiched therebetween, respectively, in the direction substantially perpendicular to the tracking direction.

59. An apparatus according to claim 57, wherein the objective lens is secured to the movable member arranged inside the cylindrical body made of non-magnetic material, the movable member comprises first and second projections made of magnetic material and protruding outside the cylindrical body through slots formed in the cylindrical body in a direction substantially in parallel with the tracking direction, the first and second magnetic members and the fourth and fifth magnetic members are so arranged that the first and second projections are sandwiched therebetween, respectively, in the direction substantially perpendicular to the tracking direction.

60. An apparatus according to claim 56, wherein the objective lens is secured to the movable member arranged inside the cylindrical body made of non-magnetic material, the movable member comprises first and second projections made of magnetic material which protrude outside the cylindrical body through slots formed in the cylindrical body in a direction substantially perpendicular to the tracking direction and the first and second magnetic members and the fourth and fifth magnetic members are so arranged that the first projection is opposed to the one end portions of the first and fourth magnetic members and the second projection is opposed to the one end portions of the second and fifth magnetic members.

61. An apparatus according to claim 55, wherein the means for driving the cylindrical body made of non-magnetic material in the focussing direction comprises a voice coil wound on a ring-like member connected to the cylindrical body and a magnetic assembly which includes a permanent magnet and is secured to the fixed body for producing a magnetic flux passing through the voice coil, and the voice coil is supplied with a signal corresponding to a focussing error signal representing the variation in the distance so as to move the cylindrical body and thus the objective lens in the focussing direction.

62. An apparatus according to claim 61, wherein the fixed part of the apparatus is formed by an outer cylindrical body made of non-magnetic material and arranged outside and coaxially with the intermediate cylindrical body and the means for supporting the intermediate cylindrical body comprises a pair of leaf spring members arranged between the intermediate cylindrical body and the outer cylindrical body at their upper and lower ends, respectively.

63. An apparatus according to claim 62, wherein each of the pair of leaf springs is formed by a generally disc-shaped leaf spring having a plurality of spiral arms.

64. An apparatus according to claim 58, wherein the gaps between the first and second projections of movable member and the first and second magnetic members and the fourth and fifth magnetic members are filled with magnetic fluid.

65. An apparatus according to claim 1, wherein the apparatus further comprises third and fourth magnetic members made of magnetic material and the first and second magnetic members are so arranged that the movable member is interposed between them substantially at their middle portions and both ends of the first and second magnetic members are coupled with each other by the third and fourth magnetic members so as to form a first magnetic circuit including the first, second and third magnetic members and the movable member and a second magnetic circuit including the first, second and fourth magnetic members and the movable member.

66. An apparatus according to claim 65, wherein the magnetic flux producing means is constituted by the third and fourth magnetic members made of permanent magnet, respectively.

67. An apparatus according to claim 65, wherein the magnetic flux producing means comprises a permanet magnet constituting at least a part of the movable member.

68. An apparatus according to claim 65, wherein the magnetic flux producing means comprises first and second permanent magnets constituting the third and fourth magnetic members, respectively, and a third permanent magnet constituting at least a part of the movable member.

69. An apparatus according to claim 65, wherein the magnetic flux producing means comprises first and second electromagnet coils wound on the third and fourth magnetic members, respectively.

70. An apparatus according to claim 65, wherein the first, second, third and fourth magnetic members are formed as individually separated parts.

71. An apparatus according to claim 67, wherein the third and fourth magnetic members are formed integrally with at least one of the first and second magnetic members, respectively.

72. An apparatus according to claim 71, wherein the first, second, third and fourth magnetic members are all formed as an integral body.

73. An apparatus according to claim 65, wherein the objective lens is secured in a lens holder which is rigidly coupled with the movable member by means of a rigid coupling rod which extends beyond the magnetic members and the holder is secured to the resiliently supporting member.

74. An apparatus according to claim 65, wherein the objective lens is secured to the movable member which also serves as a lens holder.

75. An apparatus according to claim 65, wherein the gaps between the middle portions of first and second magnetic members on which portions the first and second coils are wound, respectively, and the movable member are filled with magnetic fluid.

76. An apparatus according to claim 65, wherein the first, second, third and fourth magnetic members and the movable member are arranged substantially in a plane perpendicular to the optical axis of objective lens.

77. An apparatus according to claim 65, wherein the objective lens supporting means comprises a pair of leaf springs extending in parallel with the optical axis and substantially perpendicularly to the tracking direction, one ends of the leaf springs are secured to a holder supporting the objective lens, and the other ends of leaf springs are secured to a part of the apparatus which is fixedly arranged in the tracking direction.

78. An apparatus according to claim 77, wherein the pair of leaf springs are arranged symmetrically with respect to the optical axis of objective lens.

79. An apparatus according to claim 78, wherein the leaf springs are arranged vertically and the lens holder is secured to upper end portions of the leaf springs.

80. An apparatus according to claim 78, wherein the leaf springs are arranged vertically and the lens holder is secured to the lower end portions of leaf springs.

81. An apparatus according to claim 65, wherein objective lens supporting means comprises a pair of leaf springs extending perpendicularly to the optical axis of objective lens as well as to the tracking direction, one ends of leaf springs are secured to a holder supporting the objective lens, and the other ends of leaf springs are secured to a part of the apparatus which is fixedly arranged relative to the objective lens.

82. An apparatus according to claim 81, wherein the leaf springs are arranged symmetrically with respect to the optical axis of objective lens.

83. An apparatus according to claim 81, wherein the leaf springs are arranged in parallel with each other and symmetrically with respect to a plane which includes the optical axis and is perpendicular to the tracking direction.

84. An apparatus according to claim 76, in order to correct a variation in a distance between the objective lens and information track further comprising a focusing mechanism which comprises an intermediate member with which the objective lens is coupled by means of the supporting means;
second supporting means for supporting the intermediate member movably in a focussing direction in parallel with the optical axis of objective lens with respect to a fixed body of the apparatus; and
means for driving the intermediate member and thus the supporting means, objective lens and movable member in the focussing direction in response to a focussing error signal corresponding to the variation in said distance; whereby the first, second, third and fourth magnetic members are secured to the fixed body of apparatus.

85. An apparatus according to claim 84, wherein the intermediate member is formed by a hollow cylindrical body extending in the direction of the optical axis of objective lens and the objective lens is arranged inside the cylindrical body movably in the tracking direction.

86. An apparatus according to claim 85, wherein the means for supporting the objective lens comprises a pair of leaf springs extending inside the cylindrical body in the direction of the optical axis of objective lens, one ends of the leaf springs are secured to the objective lens and the other ends of the leaf springs are secured to an end portion of the cylindrical body.

87. An apparatus according to claim 86, wherein the cylindrical body is arranged vertically, the objective lens is arranged inside the cylindrical body near its upper end portion and the other ends of leaf springs are secured to the cylindrical body at its lower end portion.

88. An apparatus according to any one of claims 86 and 87, wherein the objective lens is secured to the movable member arranged inside the cylindrical body made of nonmagnetic material and the movable member comprises first and second projections made of magnetic material and protruding outside the cylindrical body through slots formed in the cylindrical body in a direction substantially perpendicular to the tracking direction and the first and second magnetic members are so arranged that the first and second projections are opposed to the middle portions of the first and second magnetic members, respectively.

89. An apparatus according to claim 85, wherein the means for driving the cylindrical body made of nonmagnetic material in the focussing direction comprises a voice coil wound on a ring-like member connected to the cylindrical body and a magnet assembly which includes a permanent magnet and is secured to the fixed body for producing a magnetic flux passing through the voice coil, and the voice coil is supplied with a signal corresponding to a focussing error signal representing the variation in the distance so as to move the cylindrical body and thus the objective lens in the focussing direction.

90. An apparatus according to claim 89, wherein the fixed part of the apparatus is formed by an outer cylindrical body made of non-magnetic material and arranged outside and coaxially with the intermediate cylindrical body and the means for supporting the intermediate cylindrical body comprises a pair of leaf spring members arranged between the intermediate cylindrical body and the outer cylindrical body at their upper and lower ends, respectively.

91. An apparatus according to claim 90, wherein each of the pair of leaf springs is formed by a generally disc-shaped leaf spring having a plurality of spiral arms.

92. An apparatus according to any one of claims 89, 90 and 91, wherein the gaps between the first and second projections of movable member and the middle portions of first and second magnetic members are filled with magnetic fluid.

93. An apparatus according to any one of claims 32 and 65, wherein the first and second coils wound on the first and second magnetic members, respectively, and the first and second magnetic flux producing means are so constructed that the magnetic flux produced by these coils has a direction which is the same as that of the magnetic flux passing through the first magnetic circuit, but is opposite to that of the magnetic flux passing through the second magnetic circuit, and vice versa, so that the movable member can be moved in the tracking direction linearly in accordance with the tracking signal.

94. An apparatus according to claim 1, wherein said objective lens is secured to the movable member which also serves as a lens holder.

95. An apparatus according to claim 59, wherein the gaps between the first and second projections of movable member and the first and second magnetic members and the fourth and fifth magnetic members are filled with magnetic fluid.

96. An apparatus according to claim 60, wherein the gaps between the first and second projections of movable member and the first and second magnetic members and the fourth and fifth magnetic members are filled with magnetic fluid.

97. In an objective lens tracking apparatus including an objective lens having an optical axis for projecting light onto a record medium and means for moving said objective lens in a tracking direction in a plane substantially perpendicular to said optical axis, the improvement in said means for moving comprising:

a magnetic circuit including at least one first magnetic member and at least one second magnetic member spaced in opposed relationship with respect to one another to form a gap therebetween which generally extends in the tracking direction in a plane perpendicular to said optical axis, said magnetic circuit further including means for producing a constant magnetic flux which passes through the first and second magnetic members and the gap therebetween;

means for supporting said objective lens and including a magnetic portion spaced from each of said at least one first and second magnetic members and supported within said gap and movable with said lens in a tracking direction perpendicular to said optical axis;

a first coil wound about a portion of said first magnetic member adjacent to said gap;

a second coil wound about a portion of said second magnetic member in opposed relation to said first coil and adjacent to said gap, said magnetic portion being supported in the gap between said opposed first and second coils; and means for providing a tracking signal to said first and second coils for producing a magnetic flux in said first and second magnetic members in a direction substantially parallel to said tracking direction to cause movement of said magnetic portion and said lens in said tracking direction in response to said tracking signal.

98. In an objective lens tracking apparatus including an objective lens having a optical axis for projecting light onto a record medium and means for moving said objective lens in a tracking direction in a plane substantially perpendicular to said optical axis, the improvement in said means for moving comprising:

a first cylindrical member having first and second ends and an axis coaxial with said optical axis;

a second cylindrical member having first and second ends and positioned within said first cylindrical member and having an axis coaxial with said optical axis, said second cylindrical member having opposed slots in the wall of said cylindrical member at the first end thereof and a projecting member extending from said second cylindrical member at the second end thereof;

means for supporting said second cylindrical member within said first cylindrical member including a first leaf spring coupled between the first end of said first cylindrical member and the first end of said second cylindrical member and a second leaf spring coupled to the second end of said first cylindrical member and the second end of said second cylindrical member, each of said leaf springs formed by a plurality of arms having a spiral configuration extending between an end of said first cylindrical member and an end of said second cylindrical member;

a tubular member positioned within said second cylinder and having an axis coaxial with said optical axis, said objective lens being positioned and supported within said tubular member to form said optical axis, said tubular member including first and second magnetic portions extending from said tubular member on opposite sides of said optical axis and projecting through respective ones of said slots, said magnetic portions and said slots being configured to allow movement of said tubular member in said tracking direction perpendicular to said optical axis;

at least one leaf spring coupled between said tubular member and said second cylindrical member parallel to said optical axis to support said tubular member coaxial with said second cylindrical member and allow movement of said tubular member in said tracking direction perpendicular to said optical axis;

a first magnetic member coupled to said first cylindrical member and spaced adjacent said first magnetic portion extending through one of the slots in said second cylindrical member;

a second magnetic member coupled to said first cylindrical member and spaced adjacent said second magnetic portion, said first and second magnetic members forming a gap therebetween which generally extends in the tracking direction in a plane perpendicular to said optical axis, said first and second magnetic portions being positioned for movement within said gap in said tracking direction;

means for providing a constant magnetic flux which extends through a first magnetic circuit defined by said first and second magnetic members as well as the first and second magnetic portions of said tubular member and the space between said magnetic portions and the adjacent first and second magnetic members;

a first coil wound about said first magnetic member adjacent said first magnetic portion;

a second coil wound about said second magnetic member adjacent said second magnetic portion;

means for providing a tracking signal to said first and second coils to produce a magnetic flux through said first magnetic circuit in a direction substantially parallel to said tracking direction to cause said magnetic portions and tubular member to move in said tracking direction perpendicular to said optical axis;

means for providing a second magnetic circuit having a gap which receives the projecting member of said second cylindrical member and causes a magnetic flux through said gap and projecting member;

a third coil wound about said projecting member within the gap of said second magnetic circuit; and means for providing a focusing signal to said third coil for causing movement of said second cylindrical member in a direction parallel to said optical axis to cause focusing of said objective lens with respect to said record medium.

* * * * *